March 31, 1970 — O. SCHNELLMANN — 3,503,414
PLUG-IN VALVE FOR HYDRAULIC AND PNEUMATIC CONTROL SYSTEMS
Filed Dec. 20, 1967 — 2 Sheets-Sheet 1
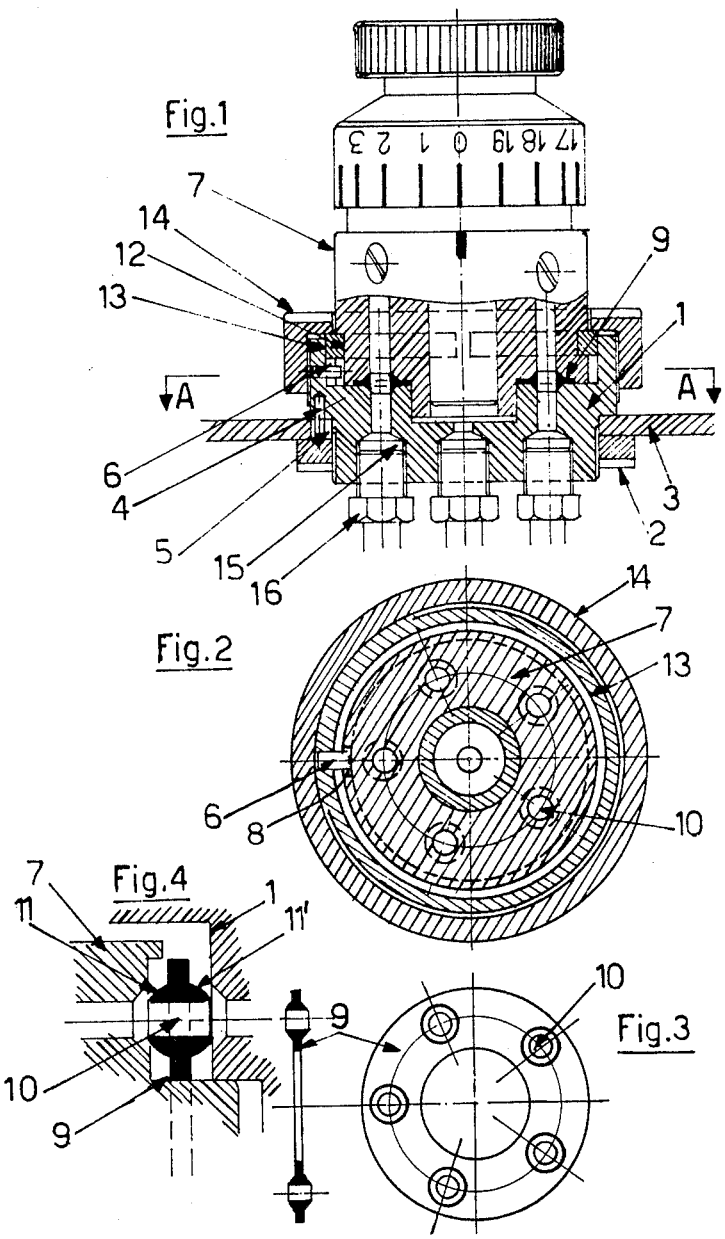
Oscar SCHNELLMANN
INVENTOR.
BY Karl J. Ross
Attorney United States Patent Office 3,503,414
Patented Mar. 31, 1970

3,503,414
PLUG-IN VALVE FOR HYDRAULIC AND
PNEUMATIC CONTROL SYSTEMS
Oscar Schnellmann, Zurich, Switzerland, assignor to
Hydrel AG., Romanshorn TG., Switzerland, a corporation of Switzerland
Filed Dec. 20, 1967, Ser. No. 692,174
Int. Cl. F16k 27/00, 51/00
U.S. Cl. 137—269
3 Claims

ABSTRACT OF THE DISCLOSURE

A plug-in valve assembly for hydraulic and pneumatic control systems on machines including baseplates with a locating pin firmly secured by means of a clamping ring in a mounting plate at standard distances from each other. The baseplates have a number of connecting pipings and a packing ring inserted therein to provide pressure-tight connection. The valve bodies for any desired function are secured to the baseplates by means of a fastening ring, a tightening ring and a locating pin in a predetermined position. The plug-in valves are arranged vertically on the mounting plate for easy access.

This invention relates to a plug-in valve for hydraulic and pneumatic control systems on machines. The underlying problem is to arrange the necessary number of valves of a control system in the smallest possible space in a clear and easily accessible manner.

For this purpose the invention is characterized in that baseplates with locating pin are firmly secured by means of clamping ring in an erecting plate at standard distances from each other, these baseplates having a definite number of connecting pipings and a packing ring inserted therein to provide pressure-tight connection, the valve-bodies for any desired functions being secured to the baseplates by means of fastening ring, tightening ring and locating pin in predetermined position, and that the plug-in valves are arranged vertically on the erecting plate, thus enabling to be quickly and easily changed when their functions have to be altered.

With valve-baseplates known heretofore an interchange of control valves of various functioning arrangements is only possible in very few cases.

In the electrical industry, plug-in units have been known and adopted for many years. For hydraulic and pneumatic control systems, because of the lack of a suitable connection of the valve-bodies with the baseplates, the erection has been effected by horizontal valves and additional erecting or connecting plates. In the known design, for instance, with a valve-combination on a machine tool, considerably more space is required. The embodiment according to the invention makes it possible for the basic elements for the valve erection to be standardized. In addition, the run of the piping in an arrangement with vertical valves is very much simpler, since all connections lie in one plane with the piping-erection axis.

Further merits will be apparent from the following description and claims, taken in conjunction with the accompanying drawing showing plug-in valves according to the invention.

In said annexed drawing:

FIG. 1 show in part-sectional view the plug-in valve of said form of embodiment with the erecting plate;

FIG. 2 is a section taken on the line A—A of FIG. 1;

FIG. 3 is a view and a section of the packing disk in the plug-in valve of the form of embodiment;

FIG. 4 shows a section through a duct-passage in the plug-in valve with packing disk and baseplate.

Figure 5:
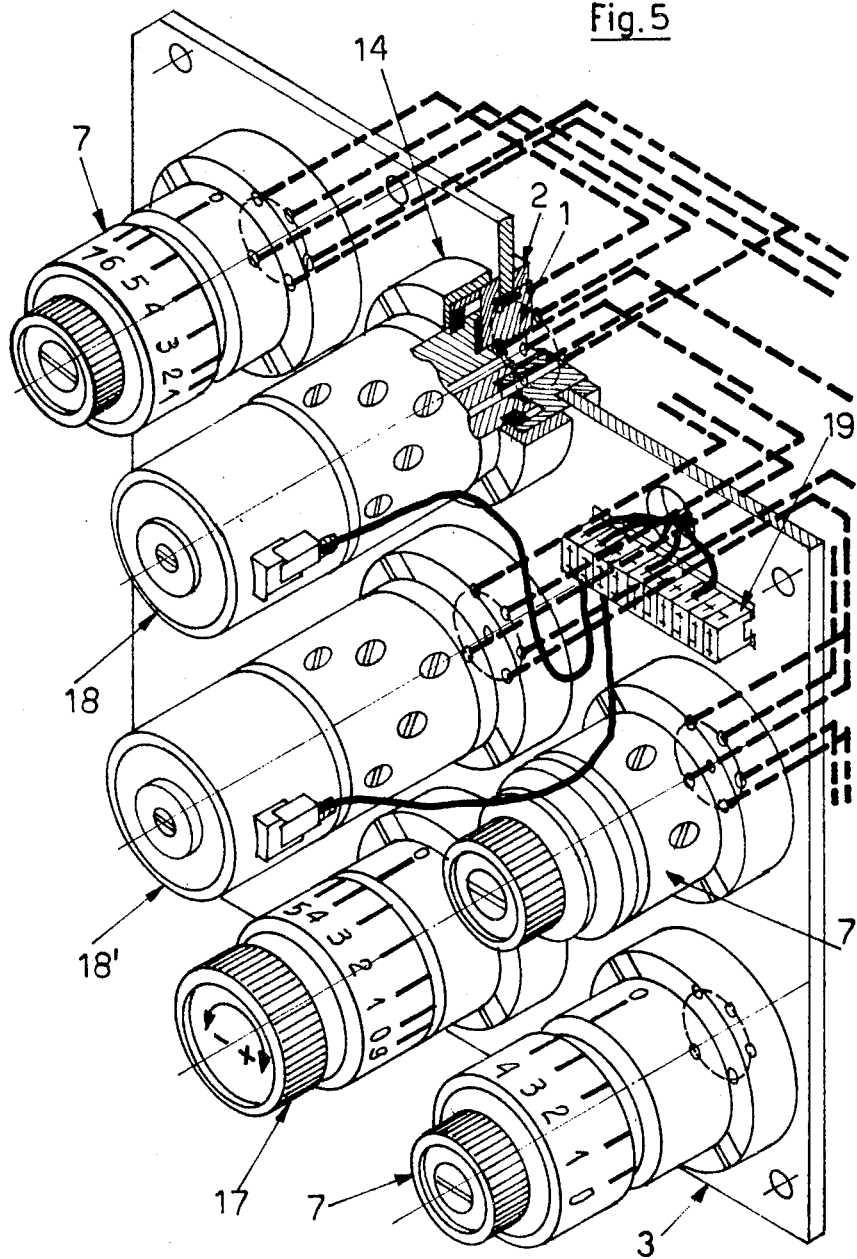
FIG. 5 shows a perspective view of the arrangement of plug-in valves on an erecting plate.

The plug-in valve shown in the drawing comprises a baseplate 1 of circular outline with clamping ring 2 for rigid fixing to the erecting plate 3, a locating pin 4 being pressed into the baseplate 1 and adapted to engage a positioning notch 2 in erecting plate 3. In addition, baseplate 1 is provided with a locating pin 6 to fix its position, and through this pin 6, in conjunction with a notch-system 8, the built-in position in the valve-body of the optionally inserted control valves 7 is ensured. The control valve has inserted therein a packing ring 9 having a definite number of apertures 10 parallel to its middle axis and with packing-bulges 11 and 11' on the two sides, which latter bulges engage in bored recesses in baseplate 1 and in valve-body 7 and furnish a reliable and pressure-tight packing. Packing ring 9 may be made with two to five apertures 10 as desired, for taking the piping ducts to comply with the special requirements of the functioning valves. At the connecting portion, the valve-body 7 is provided with a groove 12, into which is laid a securing ring 13 formed in two parts. By means of a tightening ring 14, valve-body 7 is held pressure-tight against baseplate 1. Baseplate 1 is provided with all the necessary screwthreads 15 for the piping connections 16, so that all pipings 16 lie behind the erecting plate 3. FIG. 5 shows a clear and compact erecting arrangement of the plug-in valves 7, 17, 18 and 18' fitted for any desired functions on erecting plate 3 which may be made about five millimeters thick, for instance. For magnetically actuated valves 18 and 18', a central electrical distributor 19 for the cable connection may be provided direct on erecting plate 3. From FIG. 5 it can also be seen that the pipings 16 lie together behind erecting plate 3.

The aforedescribed design and arranging of the plug-in valves make it possible to have a clear and space-saving assembly of the valve units on an erecting plate, which has solely the reception-bores with check-grooves for the baseplates. All hydraulic or compressed-air pipe lines are erected behind the erecting plate and clearly arranged. In the case of any trouble in function occurring, or if the function of any valve has to be altered, this arrangement of the valves allows of sets of valves being changed without any great difficulty arising. One essential advantage also is that the known expensive and bulky valve-baseplates can be dispensed with, such plates having also the drawback of being as a rule of different dimensions for each valve.

By means of the especially designed packing rings any combination of connections may be attained, inasmuch as these packing rings are available in modified forms with two to five apertures and easily interchangeable. Because of the central tightening-ring clamping, reliable and pressure-tight sealing of the ducts is ensured. The performing and arranging of the several control functions within the valves create no problems for this method of erecting and therefore need not be further described.

What I claim is:

1. A plug-in valve for hydraulic and pneumatic control systems on machines, wherein baseplates with locating pin are firmly secured by means of clamping ring in an erecting plate at standard distances from each other, said baseplates having a definite number of connecting pipings and a packing ring inserted therein to provide pressure-tight connection, the valve-bodies for any desired functions being secured to the baseplates by means of fastening ring, tightening ring and locating pin in predetermined position and the plug-in valves are arranged vertically on the erecting plate, thus enabling to be quickly and easily changed when their functions have to be altered.

2. A plug-in valve as defined in claim 1, wherein the packing rings for the reliable sealing of the several passages between valve-body and baseplate engage with bulges on each side into recesses in valve-body and baseplate, the packing rings being provided with two to five apertures, analogously to the number of necessary pipe-lines to the valve-bodies contained in the assembly.

3. A plug-in valve as claimed in claim 1, characterized in that it is erected vertical on the front side of the erecting plate, and that all pipe-lines are laid behind that plate.

References Cited

UNITED STATES PATENTS

| | | | |
|---|---|---|---|
| 3,323,547 | 4/1967 | Van Husen, et al. | 137—269 |
| 3,398,764 | 8/1968 | Herion | 137—625.64 XR |

M. CARY NELSON, Primary Examiner

ROBERT J. MILLER, Assistant Examiner

U.S. Cl. X.R.

137—608; 251—143